United States Patent [19]

Takeoshi

[11] 4,048,142

[45] Sept. 13, 1977

[54] POLYETHERIMIDES

[75] Inventor: Tohru Takeoshi, Scotia, N.Y.

[73] Assignee: General Electric Company, Schenectady, N.Y.

[21] Appl. No.: 637,698

[22] Filed: Dec. 4, 1975

Related U.S. Application Data

[63] Continuation of Ser. No. 514,030, Oct. 11, 1974, abandoned.

[51] Int. Cl.$^2$ .............................................. C08G 73/10
[52] U.S. Cl. .............................. 260/47 CP; 260/30.2; 260/32.6 N; 260/33.4 P; 260/37 N; 260/46.5 E; 260/49; 260/50; 260/78 TF; 427/117; 428/458
[58] Field of Search ......... 260/47 CP, 78 TF, 46.5 E, 260/49, 50; 428/458; 427/117

[56]  References Cited

U.S. PATENT DOCUMENTS

| | | | |
|---|---|---|---|
| 3,179,630 | 4/1965 | Endrey | 260/78 |
| 3,179,631 | 4/1965 | Endrey | 260/78 |
| 3,179,632 | 4/1965 | Hendrix | 260/78 |
| 3,179,634 | 4/1965 | Edwards | 260/78 |
| 3,666,709 | 5/1972 | Suzuki et al. | 260/33.4 |

*Primary Examiner*—Lester L. Lee
*Attorney, Agent, or Firm*—William A. Teoli; Joseph T. Cohen; Jerome C. Squillaro

[57]  ABSTRACT

Polyetherimides are provided and a method for making such materials involving the reaction of organic diamines and 2,2',3,3'-tetracarboxydiphenyl ether dianhydride in the presence of an organic solvent. In instances where a phenolic solvent is employed, useful polyetherimide solutions can be made which can be employed in wire coating applications.

5 Claims, No Drawings

POLYETHERIMIDES

This is a continuation of application Ser. No. 514,030, filed Oct. 11, 1974, and now abandoned.

The present invention relates to polyetherimides having tetracarboxydiphenylether dianhydride units and organic diamine units and a method for making such materials.

The polyetherimides of the present invention have the formula

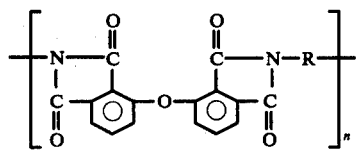

(I)

where R is a divalent organo radical selected from the class consisting of (a) aromatic hydrocarbon radicals having from 6-20 carbon atoms and halogenated derivatives thereof, (b) alkylene radicals, $C_{(2-8)}$ alkylene terminated polydiorganosiloxane, cycloalkylene radicals having from 2-20 carbon atoms, and (c) divalent radicals included by the formula,

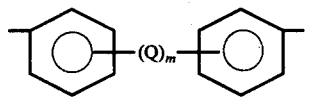

where Q is a member selected from the class consisting of —O—,

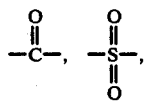

—S—, —$C_xH_{2x}$— and $x$ is a whole number from 1 to 5 inclusive, $m$ is 0 or 1, and $n$ is an integer equal to from 2 to 2500 inclusive.

The polyetherimides of formula I can be made by a method which comprises 1. effecting reaction between an organic dianhydride of the formula

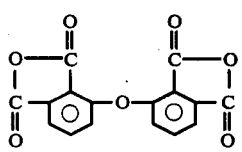

(II)

An organic diamine of the formula

 , (III)

in the presence of organic solvent at temperatures of at least 130° C, while effecting the removal of water of reaction, 2. separating a polyetherimide from the resulting mixture of 1) where R is as previously defined.

The polyetherimides of formula I can be employed as injection molding compounds and utilized in combination with fillers such as silicon fillers, glass fibers, etc.

These polyetherimides can have intrinsic viscosity in the range of from 0.1 to 0.90 in m-cresol depending upon the conditions utilized in the polymerization reaction as well as the solvent employed. In instances where phenolic solvent is utilized, solutions of the polyetherimide can be employed under ambient conditions as a wire coating formulation.

The organic dianhydrides, specifically, 2,2', 3,3', -tetracarboxydiphenylether dianhydride of formula II and a method for making such material is shown in copending application of Tohru Takekoshi and Allen S. Hay (Ser. No. 372,771) filed concurrently herewith and assigned to the same assignee as the present invention. As disclosed in Ser. No. 372,771, the organic dianhydride of formula II can be made by effecting the condensation of 3-nitrophthalic anhydride with a catalytic amount of a nitrite salt under melt conditions or in the presence of an organic solvent. A suitable nitrite salt, for example, can be sodium nitrite which can be utilized in amounts of up to about 5% by weight of the condensation mixture. Included by the organic diamines of formula III there are, for example, m-phenylenediamine;
p-phenylenediamine;
4,4'-diaminodiphenylpropane;
4,4-diaminodiphenylmethane;
benzidine;
4,4'-diaminodiphenyl sulfide;
4,4'-diaminodiphenyl sulfone;
4,4'-diaminodiphenyl ether;
1,5-diaminonaphthalene;
3,3'-dimetylbenzidine;
3,3'-dimethoxybenzidine; 4,4'-diaminobenzophenone;
2,4-bis($\beta$-amino-t-butyl)toluene;
bis(p-$\beta$-amino-t-butylphenyl)ether;
bis(p-$\beta$-methyl-o-aminopentyl)benzene;
1,3-diamino-4-isopropylbenzene;
1,2-bis(3-aminopropoxy)ethane;
m-xylylenediamine;
p-xylylenediamine
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine;
bis(3-aminopropyl)tetramethyldisiloxane;
bis(4-aminobutyl)tetramethyldisiloxane; etc.

Some of the organic solvents which can be employed alone or in combination as a mixture to effect reaction between the above organic dianhydride and organic diamine are phenolic solvents which include mixtures of phenol o-, p-, and m-cresols, known as cresylic acid and mixtures of cresylic acid with phenol. Additional phenolic solvents also include chlorinated phenols such as o-, p-, and m-chlorophenols. In addition to the aforementioned organic solvents there also can be included benzene, toluene, xylylene, ethyl benzene, propyl benzene, chlorobenzene, dichlorobenzene, trichlorobenzenes, biphenyl, terphenyl, diphenyl ether, diphenyl sulfide, chlorinated biphenyls, chlorinated diphenyl ethers, dichloroethane, tetrachloroethane, trichloroethylene, tetrachloroethylene, methylcyclohexane, octane, isoctane, decane, etc.

In the practice of the method of the invention, reaction is effected between the organic dianhydride and the organic diamine in the presence of the above described organic solvent.

The order of addition of either reactions is not critical. It is preferred to effect the reaction of the organic dianhydride and the organic diamine in an inert atmosphere such as nitrogen. Experience has shown that sufficient organic solvent should be utilized to provide a solids content in the range of between 1% to 90%.

Reaction can be effected at temperatures of from 130° to 300° C and preferably from 150° to 250° C.

In order to facilitate contact between the organic dianhydride and the organic diamine, the reaction mixture can be agitated such as by stirring, etc. Substantially equal moles of reactants has been found to provide for optimum molecular weight of polymer; however, there can be employed from 0.5 to 2 moles and preferably 0.9 to 1.1 moles of organic dianhydride per mole of organic diamine for effective results.

Reaction between the organic dianhydride of formula II and the organic diamine of formula III can vary from 0.5 to 20 hours depending upon such factors as the temperature employed, degree of stirring, nature of reactants, etc.

During the course of polymer formation, water of reaction is continuously removed. The course of the reaction can be readily determined by the actual amount of water generated, as a percentage of the theoretical. In particular instances a mixed solvent system can be employed consisting of a well-boiling azeotropic solvent and a higher boiling solvent.

At the termination of the reaction, recovery of polyetherimide can be effected by pouring the polymer solution upon cooling into a precipitant such as methanol, etc., followed by washing, filtering, etc.

In order that those skilled in the art will be able to practice the invention, the following examples are given by way of illustration and not by way of limitation. All parts are by weight.

EXAMPLE 1

A mixture of 3.638 parts of 2,2', 3,3'-tetracarboxydiphenyl ether dianhydride, 2.006 parts of 4,4'-diaminodiphenyl ether, 26 parts of ortho-dichlorobenzene, 20.06 parts of meta-cresol and 4.3 parts of toluene was heated to reflux for 3 hours. During the refluxing of the mixture water was continuously removed. There was obtained a clear, slightly yellow reaction mixture which was poured into methanol to effect a precipitation of product. There was obtained a yield of 97.4%. The product had an intrinsic viscosity of 0.407 dl/g in dimethylformamide. Based on method of preparation the product was a polyetherimide having the average formula,

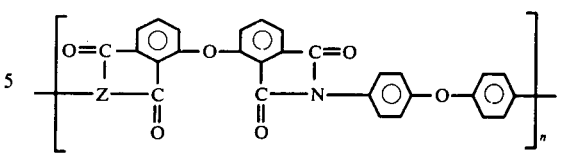

where $n$ is an integer having a value up to about 2500.

Elemental analysis and its infrared spectrum confirmed the identity of the above structure.

A copper wire is immersed in a 10% solution of the above polyetherimide in meta-cresol. The treated wire is oven dried. There is obtained an insulated copper conductor.

EXAMPLE 2

A mixture of 3.08 parts of 2,2'3,3'-tetracarboxydiphenyl ether dianhydride and 1.969 part of diaminodiphenylmethane, about 25 parts of meta-cresol and 4.3 parts of toluene was refluxed at 170° C for 2 hours. A molecular sieve was employed to effect the removal of water of reaction. There was obtained a viscous, clear reaction mixture which was poured into methanol. A product precipitated at a yield of 92.8%. The product was soluble in meta-cresol but not in dimethylformamide. Based on method of preparation, the product was a polyetherimide having the following average formula,

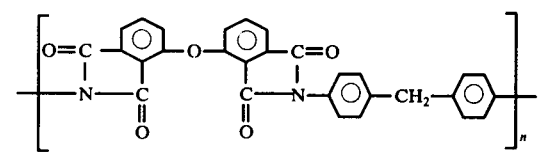

where $n$ is an integer having a value of up to about 500.

The identity of the product was confirmed by elemental analysis and its infrared spectra.

EXAMPLE 3

A mixture of 3.10 parts of 2,2', 3,3'-tetracarboxydiphenyl ether dianhydride, 1.16 parts of hexamethylenediamine and 50 parts of ortho-dichlorobenzene was stirred and heated to reflux. The water was removed by azeotropic distillation. The heating at reflux temperature was continued for five hours. The reaction mixture was cooled and poured into methanol to effect precipitation of product. Fibrous product was obtained at a yield of 94.0%. The product had an intrinsic viscosity of 0.42 dl/g in dimethylformamide. Based on method of preparation, elemental analysis and infrared spectroscopy, the product was a polyetherimide having the following average formula,

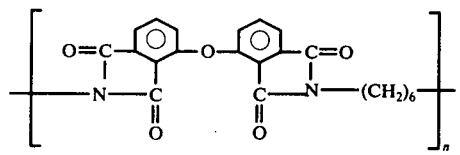

where $n$ is an integer equal to up to about 2500.

Although the above examples are limited to only a few of the very many polyetherimides which can be made in accordance with the practice of the invention, it should be understood that a much broader class of polyetherimides can be made using the dianhydride of formula II with the organic diamine of formula III.

What I claim as new and desire to secure by Letters Patent of the United States is:

1. Polyetherimides having the formula

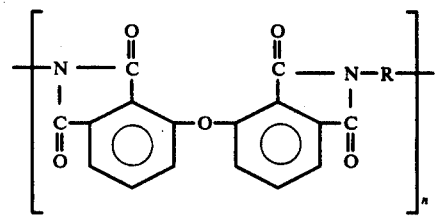

where R is a divalent organo radical selected from the class consisting of (a) aromatic hydrocarbon radicals having from 6–20 carbon atoms and halogenated derivatives thereof, (b) alkylene radicals, $C_{(2-8)}$ alkylene terminated polydiorganosiloxane cycloalkylene radicals having from 2–20 carbon atoms, and (c) divalent radicals included by the formula,

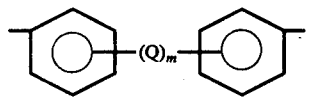

where Q is a member selected from the class consisting of —O—,

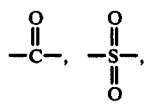

—S—, —$C_xH_{2x}$— and $x$ is a whole number from 1 to 5 inclusive, $m$ is 0 or 1 and $n$ is an integer equal to from 2 to 2500 inclusive.

2. A polyetherimide in accordance with claim 1, where R is

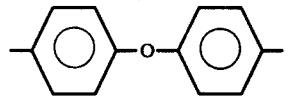

3. A polyetherimide in accordance with claim 1, where R is

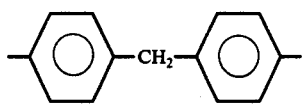

4. A polyetherimide in accordance with claim 1, where R is

—(CH$_2$)$_6$—

5. A wire coating formulation comprising a solution of a polyetherimide in a phenolic solvent, where the polyetherimide has the formula,

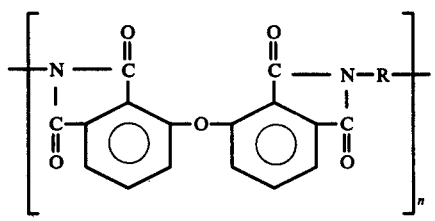

where R is a divalent organo radical selected from the class consisting of (a) aromatic hydrocarbon radicals having from 6–20 carbon atoms and halogenated derivatives thereof, (b) alkylene radicals, $C_{(2-8)}$ alkylene terminated polydiorganosiloxane cycloalkylene radicals having from 2–20 carbon atoms, and (c) divalent radicals included by the formula,

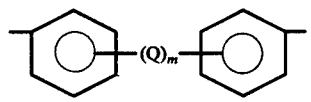

where Q is a member selected from the class consisting of —O—,

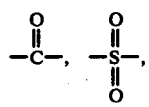

—S—, —$C_xH_{2x}$— and $x$ is a whole number from 1 to 5 inclusive, $m$ is 0 or 1 and $n$ is an integer equal to from 2 to 2500 inclusive.

* * * * *